United States Patent

[11] 3,614,195

[72] Inventor David W. Vollmer
Brighton, N.Y.
[21] Appl. No. 875,465
[22] Filed Nov. 10, 1969
[45] Patented Oct. 19, 1971
[73] Assignee Bausch & Lomb Incorporated
Rochester, N.Y.

[54] RETARDATION COMPENSATOR PLATE FOR A POLARIZING MICROSCOPE
11 Claims, 4 Drawing Figs.
[52] U.S. Cl. .................................................. 350/13, 350/14, 350/157
[51] Int. Cl. ........................................... G02b 29/28
[50] Field of Search ........................................ 350/12-15, 157

[56] References Cited
UNITED STATES PATENTS
| | | | |
|---|---|---|---|
| 1,926,716 | 9/1933 | Ehringhaus .................. | 350/157 |
| 2,017,869 | 10/1935 | Plugge ........................ | 350/157 X |
| 2,785,601 | 3/1957 | Francon ...................... | 350/14 |
| 2,924,142 | 2/1960 | Nomarski ..................... | 350/13 |

Primary Examiner—David Schonberg
Assistant Examiner—Paul R. Miller
Attorney—Frank C. Parker ABSTRACT: A retardation plate for use in an Ehringhaus-type compensator for measuring retardation of light in a polarizing microscope, said plate being composed of two elements of plane parallel polished crystal quartz, the relative thickness of which have numerical ratio other than 1.0 and preferably have a numerical ratio of substantially 0.6.

PATENTED OCT 19 1971    3,614,195
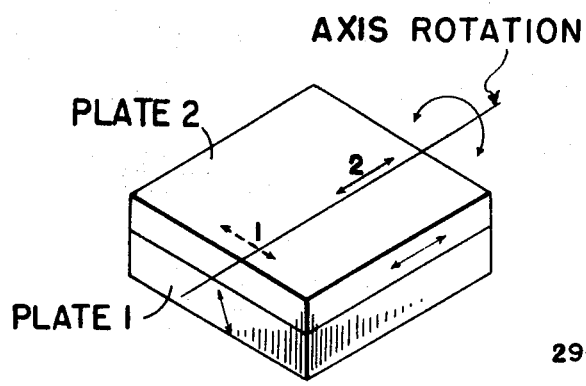
FIG. 4
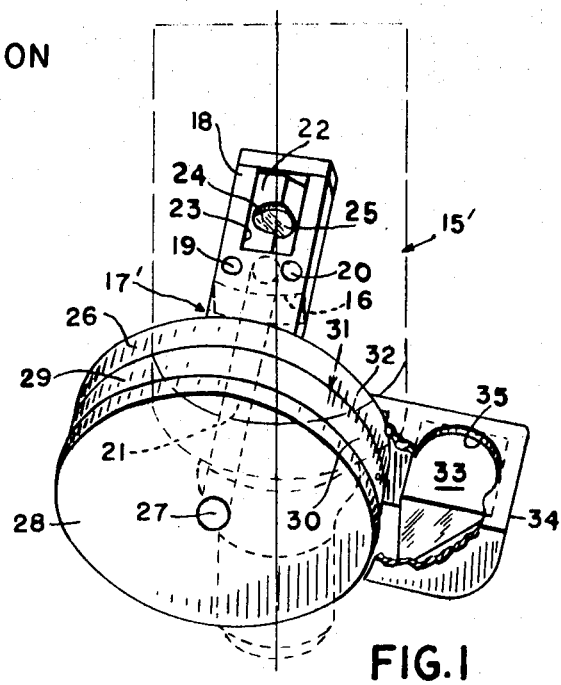
FIG. 1
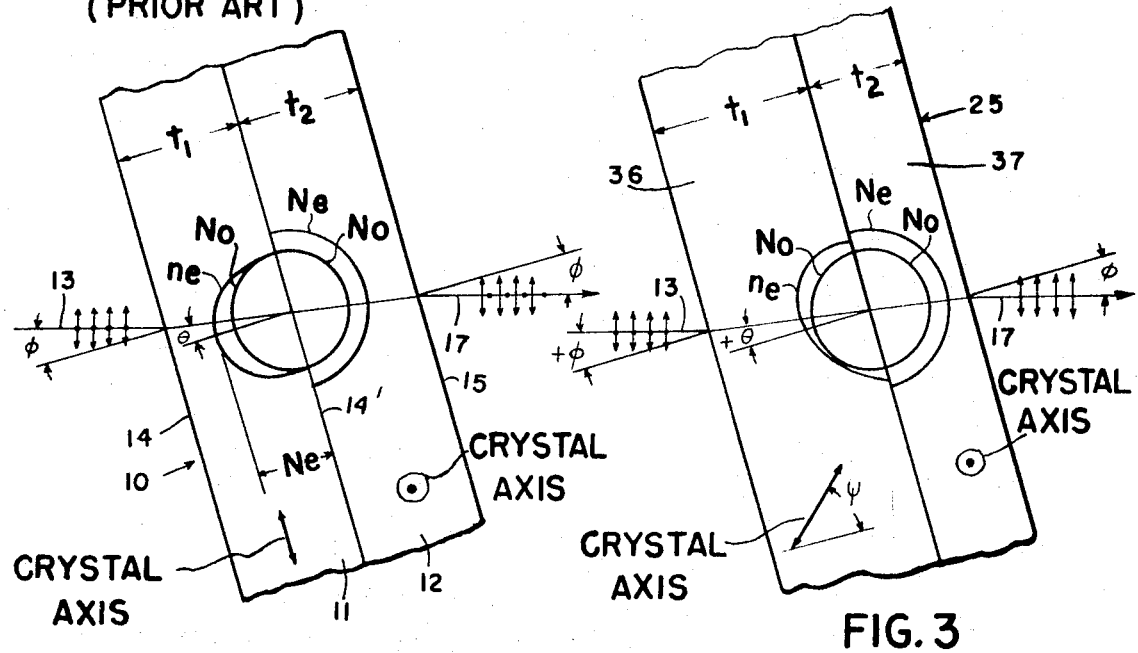
(PRIOR ART)
FIG. 2
FIG. 3
DAVID W. VOLLMER
INVENTOR.
BY *Frank C. Parker*
ATTORNEY

RETARDATION COMPENSATOR PLATE FOR A POLARIZING MICROSCOPE

BACKGROUND OF THE INVENTION

The present invention relates to a compensator retardation plate which is used in a polarizing microscope for measuring the retardation of light passing therethrough, and more particularly it relates to a new construction of said plate.

Uniaxial crystalline materials have the property that they seem to exhibit two principal refractive indices: $N_o$ for rays polarized so that the electric vector is perpendicular to the optic axis; and $N_e$ for rays polarized so that the electric vector is parallel to the optic axis. Rays of intermediate polarizations having the electric vector neither parallel nor perpendicular to the optic axis will appear to experience a range of effective indices, $n_e$, between these values. Therefore, there are two optical paths associated with any geometrical distance, designated $d$, in a uniaxial crystal and these paths are denoted $N_o d$ and $n_e d$.

The retardation of a ray of polarized light as it traverses this geometrical distance is defined as the difference between the two aforementioned optical paths.

The basic prior art device known as the Ehringhaus compensator, shown in the optical diagram FIG. 2 of the drawing, is formed from two plane-parallel birefringent similar crystal plates mounted so as to be rotatable about a mechanical axis which is perpendicular to the plane of the FIG., said compensator being generally designated by numeral 10 and said plates being designated 11 and 12. As may be seen in the Fig., both crystal plates are cut parallel with their crystal, or optic, axes.

In FIG. 2 assumed incident rays 13 are refracted through plates 11 and 12 at an angle designated $\theta$ with respect to a normal drawn from one of the refractive faces 14, 14' and 15 of the plates. The corresponding exit rays are designated by numeral 17 and are inclined to said normal at an angle designated $\Phi$.

The aforementioned rotation of the plates 11 and 12 causes the exit angle $\Phi$ to vary as well as the angle $\theta$. FIG. 2 is somewhat simplified since the rays which have the two distinct polarizations do not actually travel in exactly the same path through the compensator 10. However, these two rays leave the compensator in a direction parallel to their angle of incidence or entering angle, and the separation of said rays in a compensator made of crystal quartz is very small. Accordingly, the equations which will be deduced from FIG. 2 serve to illustrate the main principles involved.

Thus, when the polarized light ray 13, or wave 13 if the reader prefer, strikes the face 14 of the crystal 11, it is the well-known property of a birefringent crystal that the polarized oscillations are resolved into mutually perpendicular oscillations.

It is helpful at this point to adopt for the sake of analysis the convention that the polarizing microscope is oriented to three mutually perpendicular directions $x$, $y$ and $z$, such that $z$ corresponds to the direction of the optical axis of the microscope while $x$ corresponds to the direction of the crystal axis of crystal 11 when the angles $\Phi$ and $\theta$ are zero, i.e. when the compensator is in the horizontal position. The $y$ direction thus will correspond to the direction of the crystal axis of the crystal 12. The $y$ direction therefore is perpendicular to the plane of the figure and it is the same as the direction of the axis about which the compensator is tipped.

The polarized oscillations are therefore resolved in the crystal 11 into two waves, one oscillating in the $x$ direction and one oscillating in the $y$ direction, and both of them proceeding in the $z$ direction, up the microscope tube. The $y$-wave enters the crystal 11 and becomes the ordinary wave (or ray) while the $x$-wave becomes the extraordinary wave. Their perpendicular orientation results in their making a different rate of progress through the uniaxial crystal. These different rates of progress may be taken as different refractive indices and they are so treated herein.

It should be noted that both waves will oscillate in $x$-$y$ planes and that the crystal axes of the conventional Ehringhaus compensator are also in $x$-$y$ planes when the compensator is in the horizontal position, i.e. when $\Phi$ and $\theta$ are zero. When the compensator is tipped, i.e. when $\Phi$ and $\theta$ become nonzero, then the $x$-wave will meet the crystal axis of crystal 11 at the angle $\Phi$. Its rate of progress, or refractive index $n_e$, will therefore be a function of the angle $\Phi$, and $n_e$ can therefore be drawn as an ellipse whose minor axis is parallel to the crystal axis and whose major axis is perpendicular to the crystal axis.

Since the crystal axis of the crystal 12 is perpendicular to that of the crystal 11, the $x$-wave, which in the crystal 11 was the extraordinary wave, becomes the ordinary wave when it passes into the crystal 12. Similarly the $y$-wave, the ordinary wave of the crystal 11, becomes the extraordinary wave of the crystal 12. The $y$-wave is oscillating parallel with the crystal axis of crystal 12 and it therefore progresses according to a uniform refractive index $N_e$ irrespective of the angles $\Phi$ and $\theta$. The $x$-wave meets the crystal axis of the crystal 12 at a perpendicular and it therefore experiences a uniform refractive index $N_o$, irrespective of the angles $\Phi$ and $\theta$.

Thus, the relative retardation of the $x$-wave and the $y$-wave is dependent upon the refractive index $n_e$, which in turn depends upon the angle $\Phi$ at which the Ehringhaus compensator is tipped.

FIG. 2 the circle, the semicircle and the semiellipse represent diagrammatically the variations respectively of the indices $N_o$, $N_e$ and $n_e$ as a function of $\Phi$ or $\theta$.

Referring to FIG. 2, the optical path length traversed by the component of the ray which is polarized in the plane of the Fig., i.e. the $x$-wave is:

(1)
$$R_1 = \frac{n_e t_1 + N_o t_2}{\cos \theta}$$

The optical path length traversed by the component which is polarized perpendicular to the plane of the paper, i.e. the $y$-wave is:

(2)
$$R_2 = \frac{N_o t_1 + N_e t_2}{\cos \theta}$$

The retardation $R$ of one ray with respect to the other is the difference between these two optical path lengths; i.e.: $R = R_1 - R_2$ (3)
$$R = \frac{(n_e - N_o)t_1 - (N_e - N_o)t_2}{\cos \theta}$$

If $t_1 = t_2$ as found in the Ehringhaus compensator equation (3) becomes (4)
$$R = \frac{(n_e - N_e)t}{\cos \theta}$$

Examination of equation (4) together with FIG. 2 indicates the following properties of the Ehringhaus compensator, assuming that crystal quartz is the material of construction.
a. For $\Phi = \theta = 0$, $n_e = N_e$ and the retardation is zero.
b. The retardation has the same value for $\pm \theta$.
c. For any given $\theta$, the retardation is proportional to the $t$ (thickness of one plate).
d. Starting from $\theta = 0$, the retardation increases negatively slowly at first, since $n_e$ is nearly parallel to $N_e$ at this angle. Then retardation increases more rapidly and finally more slowly again as $\theta$ reaches its maximum value and $n_e$ becomes more nearly parallel to $N_e$.

The Ehringhaus compensator is provided with a graduated scale for the measurement of $\Phi$ and a calibration curve is commonly provided for converting $\Phi$ into retardation. However, in practical polarization microscope the maximum value of $\Phi$ attainable will be limited by mechanical interferences and vignetting of light because the clear aperture of the crystal quartz will be reduced by a cos $\Phi$ factor. Since the retardation is determined by measuring $\Phi$, a large range of $\Phi$ is desirable for maximum precision, but since $\pm \Phi$ produces the same retardation, only half of the range Φ is useful in an Ehringhaus compensator, the other half being duplicative.

It will be noted in the foregoing description that the retardation produced by an Ehringhaus compensator is not linear with Φ and therefore it is inconvenient to manufacture a direct-reading instrument. In fact, a retardation scale for such a compensator graduated in nanometers of retardation would be very nonlinear and consequently a vernier-type readout for maximum accuracy could not be used therewith.

SUMMARY OF THE INVENTION

In the foregoing discussion, it was shown that retardation in the Ehringhaus compensator varies with Φ slowly for small values of Φ, then more rapidly as Φ increases, and then more slowly again. This fact indicates that there is a point of inflection on a hypothetical calibration curve, and in the region of this point retardation should be approximately linear with Φ.

According to the present invention as shown diagrammatically in FIG. 3 of the drawing, the optic axis or crystal axis of the first crystal plate 36 is rotated until the above-mentioned linear region of the calibration curve occurs when $\theta$ is approximately equal to zero. Said linear region then extends on either side of $\theta=0$ with sufficient linear accuracy to provide a practical linear scale and because of this, a vernier-type readout becomes possible.

The maximum value of Φ has been chosen consistent with the mechanical limitations found in the instrument wherein the compensator is used and 17° is believed to be a practical maximum value. Accordingly, retardation could be made zero for $\Phi_o=17°$ as was derived for a particular example from the following calculation.

The above equation (3) applies equally well to the present invention as to the Ehringhaus compensator and can be rewritten as follows:

$$(5) \quad R=[(n_e-N_o)\frac{t_1}{t_2}+(N_e-N_o)]\frac{t_2}{\cos\theta}$$

wherein $R$ represents retardation. At $\Phi=\Phi_o=17°$ $n_e$ can be evaluated. The ratio $t_1/t_2$ can then be adjusted to make the term in brackets equal to zero. Then $R=0$ at $\Phi=17°$.

Equation (5) further indicates that for $\Phi=\Phi_o$, retardation will be proportional to $t_2$. The value of $t_2$ for plate 37 is chosen that at $\Phi=-17°$, the maximum retardation produced is sufficient to include the full range of values desired.

In view of the foregoing discussion, it is an object of the present invention to provide a polarization compensation plate generally of the Ehringhaus type which utilizes a substantially linear retardation scale so that a Vernier readout scale may be used therewith for precise readings.

It is a further object to provide such a device whereby the Φ angle at which zero retardation is observed may be controlled along with the total range of the compensator.

Further objects and advantages may be found in the following specification and accompanying drawing wherein the invention is described in detail.

BRIEF DESCRIPTION OF THE DRAWING

FIG. 1 is a phantom perspective view of the present invention applied to a microscope, FIG. 2 is a diagrammatic view of certain parts of a prior art compensator, FIG. 3 is a diagrammatic view similar to FIG. 2 showing certain features of the present invention, and FIG. 4 is an enlarged perspective view of the crystal plate shown in FIGS. 1 and 3.

DESCRIPTION OF PREFERRED FORM OF THE INVENTION

In FIG. 1 of the drawing is shown in dotted line a part 15' of a microscope having a slot 16 wherein is securely held a retardation compensator device which is generally indicated by the numeral 17'. The compensator 17' is provided with an elongated shank 18 which is slidably fitted within the slot 16 and is held therein by a pair of spring detents 19 and 20.

Through the shank 18 is provided a bore wherein a shaft 21 is rotatably fitted. On the inner end of the shaft 21 is fixed a small mounting block 22 which is loosely housed in a recess 23 formed in the shank 18 so that said block may be rotated within the recess. Centrally through said block 22 is formed a bore 24 wherein a retardation-compensating plate 25 is secured, the bore being substantially located concentrically of the longitudinal axis of the microscope part 15' so that light may be projected therethrough.

On the exterior end of the shank 18 is fixedly formed in any suitable manner a large cylindrical portion 26 for purposes to appear hereinafter. The shaft 21 protrudes outwardly beyond the cylindrical portion 26 and on its outer end 27 is secured a knob 28 for rotating said shaft. Adjacent to the cylindrical portion 26, a corresponding cylindrical surface or rim 29 is formed on the knob 28.

On the rim 29 is engraved or otherwise formed a scale 30 in accordance with the novel retardation value scale which is described hereabove under the chapter heading "Summary of Invention." As there described, the scale 30 is made accurately linear and on the opposite cylindrical portion 26 is formed an indicia mark 31. Since the scale 30 is linear, it is possible to provide a precision readout scale in the form of a vernier 32 on the cylindrical portion 26 as shown in FIG. 1.

For conveniently observing the scales 30 and 32, a 90° prism 33 is mounted adjacent to the cylindrical scale surfaces 26 and 29 so that an observer looking vertically into the prism will see both scales. The prism is held in a casing 34 which is fixed in any preferred manner not shown onto the rear face of the portion 26. A sighting aperture 35 is provided in the casing 34 in alignment with the upper face of the prism 33.

FIG. 3 represents the retardation compensator plate 25 constructed according to the present invention and covering a retardation range of zero to 5 micrometers (negative) for a tilt angle of the plate 25 of +17° to −17°. The compensator plate 25 is formed of two sheets 36 and 37 of crystal quartz having different thickness in a prescribed ratio as set forth herebelow. As shown in FIG. 3, the crystal axis angle $\psi$ is 40° and the thickness of the quartz sheets 36 and 37 are $$\left.\begin{array}{l} t_1=1.5 \text{ mm.} \\ t_2=0.9 \text{ mm.} \end{array}\right\} \text{ideally}$$

At least the above values should not vary beyond the values stated in the mathematical expression given herebelow;

$$0.88 < t_2 < 0.92$$
$$1.49 < t_1 < 1.51$$

The equations used in the foregoing parts of the specification serve to illustrate the general theory of the compensator and the reasoning pursued. The actual design calculations were carried out by exact ray tracing using a special computer program so that the simplifying assumptions mentioned in said parts are not required.

Table I herebelow shows the calculated values of R versus Φ for this design and shows the departure from linearity.

TABLE I

| Φ (Calculated) degrees | −R μm. | (Linear scale*) μm. | Rls−Rc μm. | % Error |
|---|---|---|---|---|
| 17.0254 | 0.0000 | 0.0000 | 0.0000 | 0.00 |
| 16 | 0.1536 | 0.1547 | 0.0011 | 0.73 |
| 14 | 0.4554 | 0.4565 | 0.0011 | 0.24 |
| 12 | 0.7570 | 0.7582 | 0.0012 | 0.16 |
| 10 | 1.0518 | 1.0600 | 0.0019 | 0.18 |
| 8 | 1.3650 | 1.3617 | −0.0033 | −0.24 |
| 6 | 1.6697 | 1.6635 | −0.0062 | −0.37 |

TABLE 1 — Continued

| Φ (Calculated degrees) | −R μm. | (Linear scale*) μm. | Rls−Rc μm. | % Error |
|---|---|---|---|---|
| 4 | 1.9743 | 1.9652 | −0.0091 | −0.46 |
| 2 | 2.2786 | 2.2670 | −0.0116 | −0.51 |
| 0 | 2.5821 | 2.5688 | −0.0133 | −0.51 |
| −2 | 2.8845 | 2.8705 | −0.0140 | −0.48 |
| −4 | 3.1853 | 3.1723 | −0.0130 | −0.41 |
| −6 | 3.4843 | 3.4740 | −0.0103 | −0.29 |
| −8 | 3.7810 | 3.7758 | −0.0052 | −0.14 |
| −10 | 4.0775 | 4.0775 | 0.0000 | 0.00 |
| −14 | 4.6543 | 4.6810 | 0.0267 | 0.57 |
| −16 | 4.9386 | 4.9828 | 0.0442 | 0.89 |

*scale factor=0.150878/degree

As aforesaid, the thickness ratio $t_1/t_2$ controls the angle $\Phi°$ at which zero retardation is observed.

The second important fact is that the total thickness $t_1+t_2$ controls the total range of the compensator 25.

If for some reason a nonlinear output of the compensator is desirable in place of the above described linear output, the angle $\psi$ might be suitably varied. Also other materials than quartz may be used if the range of retardation is to be further increased or diminished while still adhering to the design principles above set forth.

FIG. 4 shows, by means of double-headed arrows, the arrangement of the crystal axes of the two crystals which comprise the compensator. As may be seen by reference to the double-headed arrow on the right side face of plate 2, the crystal axis of plate 2 is parallel with its broad upper face. By reference to the double-headed solid line arrow labeled "2" and visible on the broad upper face of plate 2 it may be further noticed that the crystal axis of plate 2 is parallel with the axis of rotation and also with the narrow side face of the crystal.

Meanwhile, the orientation of the crystal axis of plate 1 may be seen to be inclined with respect to its broad faces by reference to the double-headed arrow on the left side face of plate 1 as seen in FIG. 4. The double-headed dashed line arrow labeled "1" as seen from the top, (and as seen through plate 2) additionally represents the crystal axis of plate 1 and it makes clear that in addition to being inclined to the broad face of plate 1, the crystal axis of plate 1 is perpendicular to the crystal axis of plate 2.

I claim:

1. In a retardation-measuring device of the kind having a compensator comprising first and second parallel-faced birefringent crystals mounted together with their crystal axes perpendicular to one another and being disposed across the vertical optical axis of a polarizing microscope for mechanically limited rotation about a horizontal axis, the amount of retardation bearing a functional relationship with the degree of rotation, the improvement comprising:

a first birefringent crystal having parallel faces cut at an angle $\psi$ to its crystal axis, said parallel faces being separated by a thickness $t_1$;

a second birefringent crystal having parallel faces, said faces being cut parallel with the crystal axis of said second birefringent crystal, and said faces being separated by a thickness $t_2$; and Said first and second birefringent crystals being mounted together in face-to-face contact with their crystal axes perpendicular to one another, said first and second crystals with said first crystal cut at said angle $\psi$ yielding a nonzero retardation when said crystals are in the horizontal position.

2. The retardation-measuring device of claim 1, wherein said thicknesses $t_1$ and $t_2$ are selected in accordance with the formula $$R = \left[ (n_e - N_0)\frac{t_1}{t_2} + (N_e - N_0) \right] \frac{t_2}{\cos\theta}$$

wherein
$N_o$ is the refractive index experienced by the ordinary ray in said crystals,
$N_e$ is the refractive index experienced by the extraordinary ray in said second crystal,
$n_e$ is the refractive index experienced by the extraordinary ray in said first crystal,
$R$ is the retardation, and
$\theta$ is the angular departure, within the crystals, of the ordinary ray from the normal of said parallel faces of said crystals, and
wherein said retardation $R$ is set equal to zero for an angle $\theta$ corresponding to a mechanical angular limit of rotation of said crystals from the horizontal; and
said retardation increases in absolute magnitude with rotation of said crystals through the horizontal position to an angular limit opposite said zero position.

3. The retardation-measuring device of claim 2, wherein said retardation varies in a substantially linear relationship with said rotation.

4. The retardation-measuring device of claim 3, wherein a scale is provided adjacent means for controlling rotation of said crystals for indicating said retardation.

5. The retardation-measuring device of claim 4, wherein said scale means is provided with vernier means.

6. The retardation-measuring device of claim 5, further comprising prism means for viewing said scale.

7. In a polarizing microscope having a retardation-measuring compensator of the kind wherein retardation is a function of an angle $\theta$ through which an optical member, comprising first and second parallel-faced birefringent crystals, is rotated, said function being nonlinear but having a portion thereof associated with an inflection, said portion approximating linearity, the improvement comprising:

a. a first crystal having faces cut at an angle $\psi$ to the crystal axis of said first crystal and a thickness $t_1$,
b. a second crystal having faces cut parallel with its crystal axis and a thickness $t_2$,
said optical member yielding a retardation having a least value at one mechanically limited extreme of rotation of said optical member and further having an increasing value as said optical member is rotated through the horizontal position to another mechanically limited extreme of rotation.

8. The improvement of claim 7, wherein said optical member is controllably connected to a knob having scale means corresponding with said retardation.

9. The improvement of claim 8, wherein said optical member yields a retardation substantially linear with said rotation of said optical member.

10. The improvement of claim 9, wherein said crystals are of quartz material, said angle $\psi$ is substantially 40° and the thicknesses $t_1$ and $t_2$ in millimeters lies within the ranges:
$1.49 < t_1 < 1.51$
$0.88 < t_2 < 0.92$.

11 The improvement of claim 9, further comprising vernier means cooperative with said scale means.